United States Patent [19]

Davis

[11] Patent Number: 6,043,861
[45] Date of Patent: Mar. 28, 2000

[54] OPTICAL WAVEGUIDE USING CHOLESTERIC LIQUID CRYSTAL POLYMER

[75] Inventor: James Lynn Davis, Parkland, Fla.

[73] Assignee: Motorola, Inc., Schaumburg, Ill.

[21] Appl. No.: 08/464,055

[22] Filed: Jun. 5, 1995

[51] Int. Cl.[7] .......................... G02F 1/133; G02F 1/1347
[52] U.S. Cl. ........................... 349/193; 349/77; 349/115; 349/176; 385/8
[58] Field of Search .................... 359/40, 41, 42; 385/123, 8, 9, 129, 130, 131, 132; 349/62, 73, 74, 77, 115, 176, 193, 194, 196, 197

[56] References Cited

U.S. PATENT DOCUMENTS

| | | | |
|---|---|---|---|
| 3,498,693 | 3/1970 | Fein et al. ............................... | 359/260 |
| 3,838,908 | 10/1974 | Channin .................................. | 359/42 |
| 3,909,113 | 9/1975 | Stotts ...................................... | 359/42 |
| 3,963,310 | 6/1976 | Giallorenzi et al. ..................... | 349/196 |
| 4,991,924 | 2/1991 | Skankar et al. .......................... | 359/42 |
| 5,223,310 | 6/1993 | Sighn et al. .............................. | 359/82 |
| 5,251,053 | 10/1993 | Heidemann .............................. | 359/145 |
| 5,339,178 | 8/1994 | Phelps, III et al. ...................... | 359/42 |
| 5,345,527 | 9/1994 | Lebby et al. ............................. | 385/901 |
| 5,379,139 | 1/1995 | Sato et al. ................................ | 359/81 |
| 5,537,233 | 7/1996 | Miura et al. .............................. | 362/27 |

OTHER PUBLICATIONS

Suinov et al "Deflector Based on Frustrated Total Internal Reflection of Light" Sov.J.Quantum Electron. 7(9)—Sep. 1977—pp. 1146–1147.

Primary Examiner—Kenneth Parker
Assistant Examiner—Tai V. Duong
Attorney, Agent, or Firm—Dale W. Dorinski

[57] ABSTRACT

An optical waveguide (5) for use in the in the visible range, the infrared range or the ultraviolet range. The waveguide has two cholesteric liquid crystal polymer layers (10) positioned parallel to each other, forming a gap between them. When electrically modulated to an 'on' state, one or more of the cholesteric liquid crystal polymer layers become optically reflective, so that the waveguide becomes internally reflective, allowing a light beam (15) to be transmitted along the waveguide. The liquid crystal polymer is optically non-reflective when electrically modulated to an 'off' state. The cholesteric liquid crystal polymer layers are each disposed on a substrate (30) having an electrically conductive layer (35) disposed between the substrate and the cholesteric liquid crystal polymer. A modulating means impresses an electrical signal upon the cholesteric liquid crystal polymer layers to convert them from the optically reflective state to the optically non-reflective state.

5 Claims, 3 Drawing Sheets

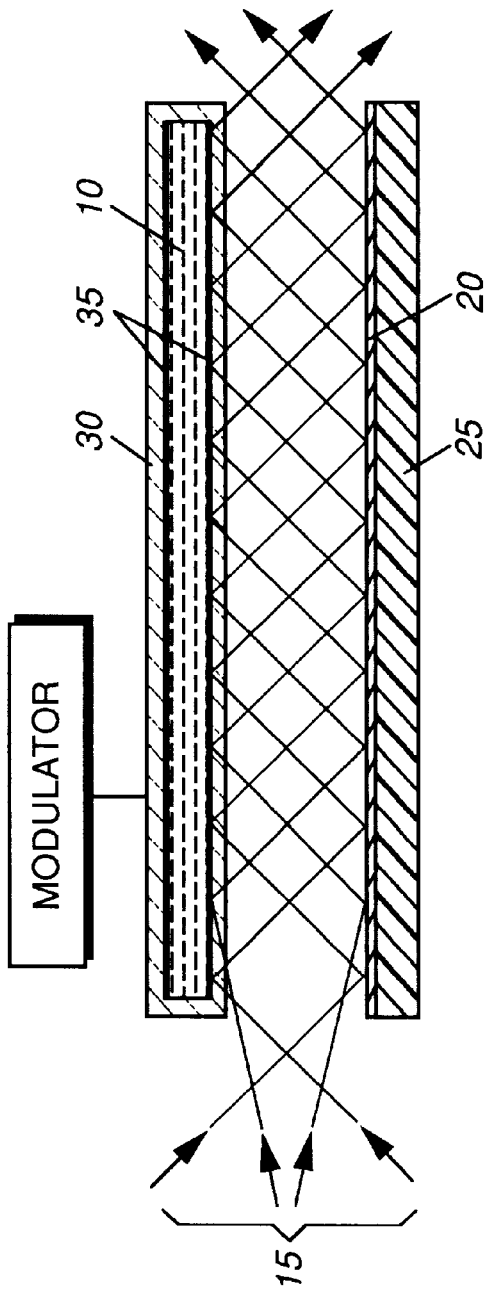
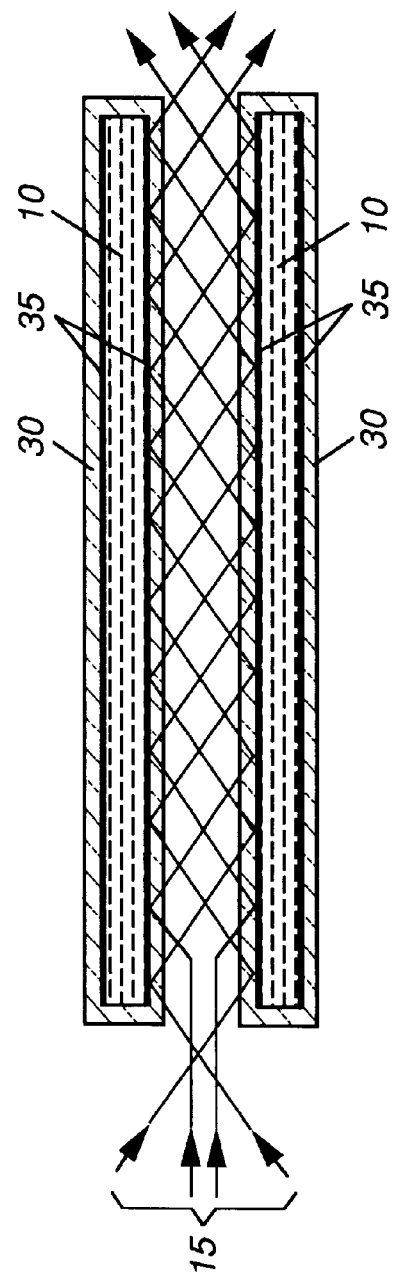

OPTICAL WAVEGUIDE USING CHOLESTERIC LIQUID CRYSTAL POLYMER

TECHNICAL FIELD

This invention relates in general to optical devices, and more specifically to optical waveguides for use in the visible, infrared or ultraviolet range.

BACKGROUND

Optic signals are widely used to communicate information from one point to another. One well-known technique is fiber optic communication, as used for telephone and data communications. An internally reflecting light pipe, such as a fiber optic cable, is used in conjunction with a light source and a light detector to transmit data. A light signal is pulsed in a pre-determined pattern, representative of the information, and imposed upon one end of the fiber optic cable. Because the cable is internally reflecting, the signal reflects back and forth in the interior of the cable, with little or no loss to the outside. These cables have specifically designed indices of refraction, and extremely high transmittancy, so that little signal loss is experienced. At the other end of the cable is an optical detector that receives the pulsed signal.

Optical waveguides are another way to transmit optical signals. A waveguide is similar to a fiber optic cable, but generally the light is transmitted down an empty cavity rather than through a glass or plastic fiber. The waveguide generally is coated with a highly reflective coating that causes the signal to be totally reflected from one side of the guide to the other. Waveguides are used for communicating signals at all frequencies of the electromagnetic spectrum, for example at radio frequencies and radar frequencies, in addition to optical frequencies.

The problem with all the prior art optical communications media is that they are fixed in the transmission mode. That is, in order to pass information, the light beam must be pulsed on and off. The fixed internally reflecting mechanism prevents the waveguide from being intersected to another waveguide, because then the signals would get intermixed at the intersection. It would be a significant addition to the art if waveguides could be coupled together without having the problem of cross-talk.

BRIEF DESCRIPTION OF THE DRAWINGS

FIG. 1 is a cross-sectional view of one embodiment of an optical waveguide in accordance with the invention.

FIG. 2 is a cross-sectional view of another embodiment of an optical waveguide in accordance with the invention.

DETAILED DESCRIPTION OF THE PREFERRED EMBODIMENT

Figure 3:
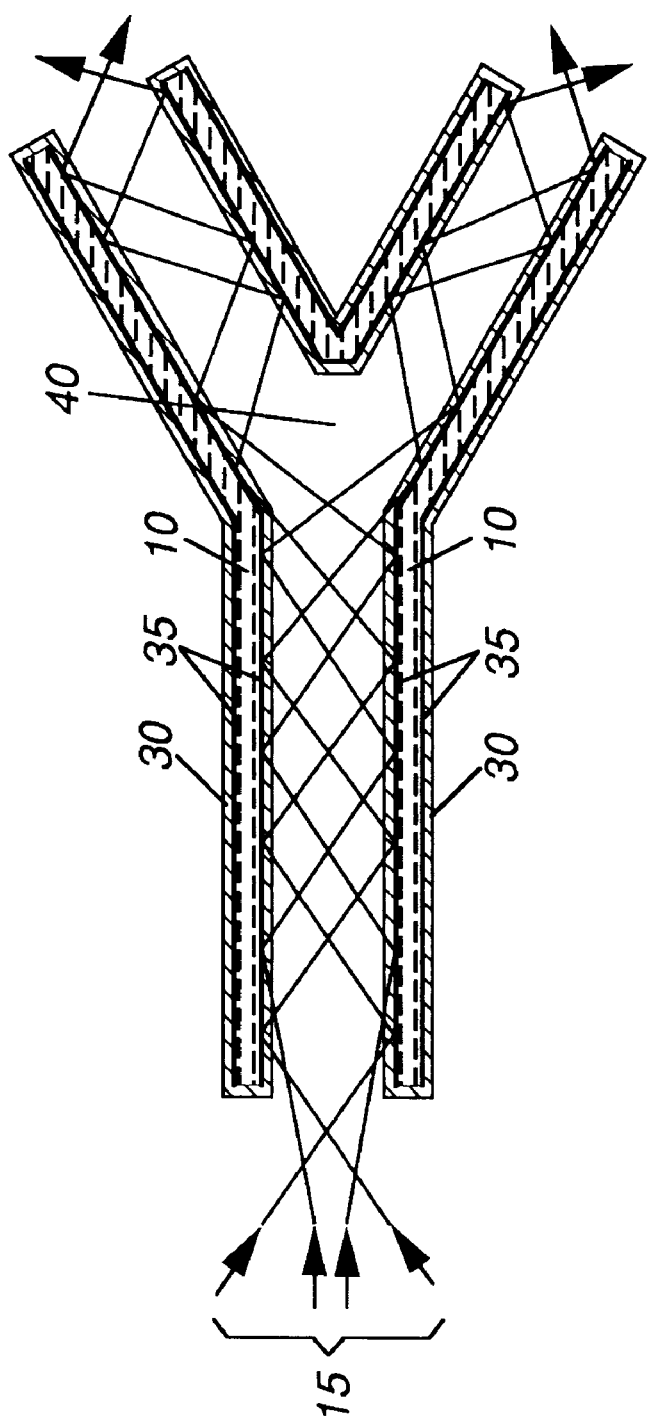
FIG. 3 is a cross-sectional plan view of a branching optical waveguide in accordance with the invention.

The instant invention is directed to use with optical signals, that is, for transmissions at the wavelength of the infrared, visible and ultraviolet portions of the electromagnetic spectrum. The term 'optical' as used herein is understood to be limited to infrared, visible, or ultraviolet light, or any combination or portion of those wavelengths. An optical waveguide is described for use in the visible range, the infrared range or the ultraviolet range. The waveguide uses an optically reflective medium positioned next to another reflecting medium, to form a gap between them. At least one of the optically reflective media is capable of being converted from an optically reflective state to a non-optically reflective state. One example of a suitable optically reflective medium is a cholesteric liquid crystal polymer. When electrically modulated to an 'on' state, the cholesteric liquid crystal polymer becomes optically reflective, so that the waveguide is internally reflective. The cholesteric liquid crystal polymer can be disposed on a substrate having an electrically conductive layer disposed between the substrate and the cholesteric liquid crystal polymer. The liquid crystal polymer can be converted to an optically non-reflective material when an appropriate electrical signal is induced, thus turning it to the 'off' state. A modulator impresses an electrical signal upon the cholesteric liquid crystal polymer to convert it from the optically reflective state to the optically non-reflective state. This eliminates the need to modulate the incoming light beam.

Cholesteric liquid crystal exists in three phases: planar, focal conical, and homeotropic. The focal conical phase is light scattering and the homeotropic phase is transmissive. However, the planar phase will reflective optical radiation at a given wavelength ($\lambda$) according to the equation:

$$\lambda = nP \cos \theta$$

where n is the index of refraction, P is the pitch length of the liquid crystal, and $\theta$ is the incident angle of the optical radiation. The three phases of cholesteric liquid crystals are known to be meta-stable, which means that they do not change unless an external stimuli is applied. Hence, if an electric bias is applied to a cholesteric liquid crystal to induce the planar orientation, then the liquid crystal remains in the reflective planar orientation even after the electrical bias is removed. When another electric bias of sufficient strength is applied, the cholesteric liquid crystal will change to another orientation or phase.

A medium which reflects optical radiation can be constructed by placing a cholesteric liquid crystal material between two surfaces each coated with a transparent conductor such as indium tin oxide (ITO). The assembly is sealed to prevent loss of the cholesteric liquid crystal fluid and a means is provided to supply an electrical signal to the ITO layer on each side of the liquid crystal. Application of an sufficient electric field aligns the cholesteric liquid crystal in the planar state which results in reflection of electromagnetic radiation at a particular frequency determined by the pitch length of the liquid crystal ($\lambda = nP \cos \theta$). Hence, electromagnetic radiation incident at an angle $\theta$ will be reflected provided that the equation is satisfied. Application of a higher electrical voltage switches the cholesteric liquid crystal from the reflecting planar state to the transparent homeotropic state. In this orientation, the medium will not reflect electromagnetic radiation but will instead transmit it.

Given the above explanation, it can now be appreciated that an optical waveguide can be built using cholesteric liquid crystal polymers to facilitate optical signal transmission. In the simplest embodiment of this invention shown in FIG. 1, the waveguide 5 consists of a metallized plastic substrate and a single medium containing a cholesteric liquid crystal. The cholesteric liquid crystal 10 is placed between two substrates 30 which previously have been coated with a transparent conductor 35 such as ITO on the sides facing the cholesteric liquid crystal. Spacing between the plastic surfaces can be maintained through the use of embossed features or spacer beads and fibers added to the liquid crystal material in a manner similar to that employed to construct a liquid crystal display. Liquid crystal displays and methods of manufacture are well known to those skilled in the art, as, for example, in U.S. Pat. No. 5,379,139, incorporated herein by reference. The cholesteric fluid is chosen to be reflective at the frequency of interest, which lies within the region of the electromagnetic spectrum from the IR to UV region. The metal layer 20 on the plastic substrate 25 can be chosen from any typical metal films including, but not limited to Cu, Au, and Al. In this construction, a metal layer is used to form one side of the waveguide, since metal surfaces are known to be reflective to electromagnetic radiation in the microwave to ultraviolet (UV) range. The structure of this waveguide is shown in FIG. 1. When the cholesteric liquid crystal 10 is in the reflective planar phase, the light 15 will propagate down the waveguide 5 by reflecting off the cholesteric liquid crystal and then off the adjacent metal layer 20. In contrast, by switching the cholesteric liquid crystal from the planar to either the scattering focal conical or the transmissive homeotropic phases, no propagation of the optical signal will occur since the upper surface (the cholesteric liquid crystal) is no longer reflective. Switching the orientation of the cholesteric liquid crystal requires only a voltage pulse since the medium is bi-stable. Hence, the waveguide is self-modulating, since the electromagnetic radiation can be shuttered by changing the phase of the cholesteric liquid crystal through the application of a proper electrical signal by a modulator.

An optical waveguide 7 can also be constructed by using two optically modulated surfaces, each constructed as described above from two plastic substrates coated with an electrically conductive layer with a cholesteric liquid crystal dispersed between them. The waveguide can be modulated by applying a voltage pulse to at least one of the cholesteric layers. Since cholesterics can be bi-stable, the liquid crystal can be placed in the reflective planar state through application of an electrical voltage pulse and will remain there until a higher voltage pulse is applied to change the orientation. A schematic of a waveguide constructed in this manner in shown in FIG. 2.

A more complicated waveguide can be constructed using the basic components outlined above. For example, a rectangular waveguide can be constructed from four surfaces containing switchable cholesteric liquid crystal fluid. The rectangular waveguide is made from a grooved substrate and a flat plastic substrate. The grooved substrate is composed of two overlaid pieces of plastic containing a three-dimensional structure forming at least a portion of the waveguide. The three-dimensional structure can be imparted to the plastic through a variety of methods including embossing, vacuum forming, photolithography, micromachining, or similar procedures. The facing surfaces of the overlaid pieces are coated with a transparent conductor such as ITO and the cholesteric liquid crystal polymer is dispersed in the gap between them. The ITO conductor layer provides a means to change the reflectivity of the cholesteric material through the application of a proper voltage. The top face of the waveguide consists of two pieces of plastic coated with ITO on the facing surfaces with a cholesteric liquid crystal disposed between the gap, as shown in FIG. 1. The cholesteric liquid crystal polymer used in this waveguide construction is chosen from those known to be reflective to the particular frequency of the incident electromagnetic radiation, when the liquid crystal is in the planar phase. Application of an electrical pulse will change the phase of the liquid crystal phase and render the material non-reflective to the electromagnetic radiation. Propagation of the electromagnetic radiation down the waveguide is achieved by supplying proper electrical voltages to the four sides of the waveguide to promoting reflection of the electromagnetic radiation off of the surfaces of the waveguide. The electromagnetic radiation is stopped or shuttered by applying an electrical signal to change one or more sides to the non-reflective focal conical or homeotropic phases of the liquid crystal.

In a further embodiment of the invention, the optical waveguide as described herein may find particular use in an electronic device, for example, creating circuitry for the electronic device. Conventional systems employ circuit paths made of copper traces etched onto the surface of a PCB, in a well-known technology. These copper circuit traces can be partially or totally eliminated and replaced with optical waveguides made in accordance to the invention. One particular use is in portable communications applications. FIG. 3 shows a plan view of a branching optical waveguide, that illustrates how the modulated waveguide may be used to create branching or intersecting circuit paths. The light beam 15 entering at the left side of the branching waveguide 8 passes through the interior, reflecting off the cholesteric layer. Upon reaching a branching point 40 the light beam 15 is split into two (or more, as required) separate paths. The continuation of the light beam on any path is dependent on the cholesteric layer in the portion of the waveguide being turned 'on'. Clearly, if the cholesteric layer in one portion of the branched path is 'off', then no light will be transmitted, and the signal propagation will cease. By selectively biasing various portions of the waveguide, the path of the data stream represented by the pulsed modulation of the cholesteric layer is determined. This is in stark contrast to conventional technology where the light pipe or optical fiber is always in a reflecting state and the path of the beam at various intersecting points cannot be independently controlled.

Figure 4:
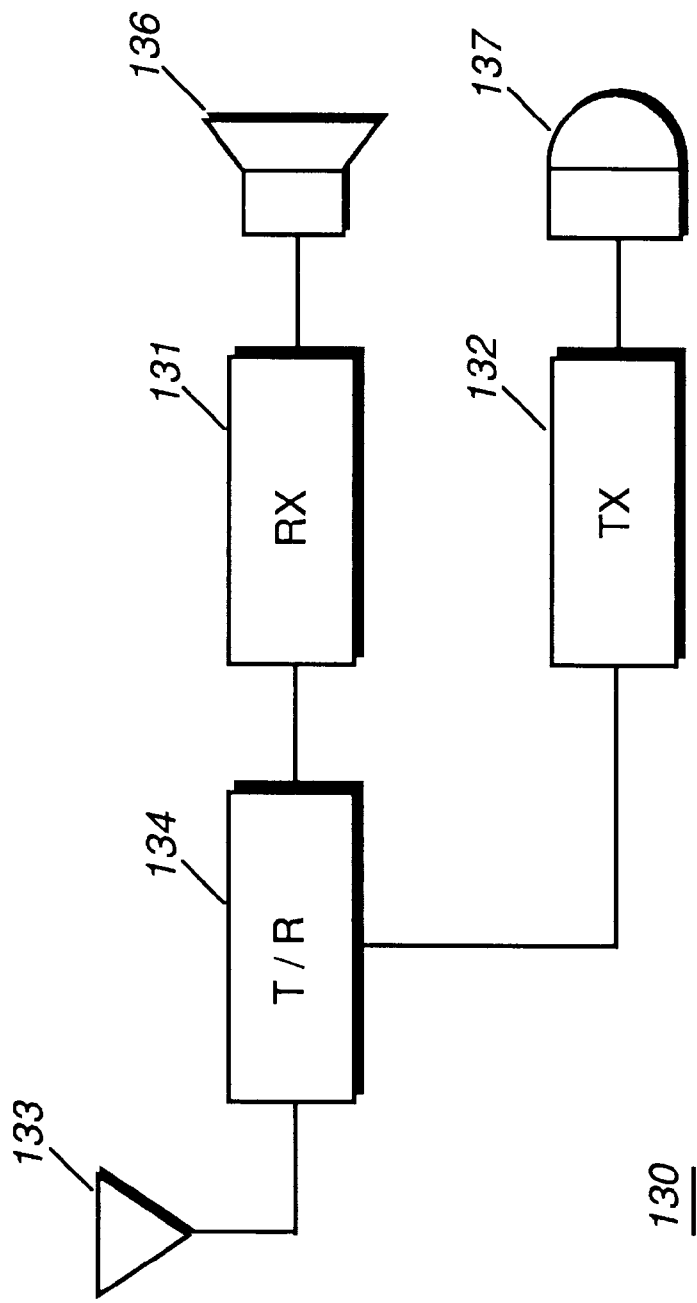
FIG. 4 is a schematic of a radio employing an optical waveguide in accordance with the invention.

Referring to FIG. 4, the optical waveguide 5 is utilized in a radio 130 comprising any well-known radio, such as portable two-way radios manufactured by Motorola Inc., which may operate in either receive or transmit modes. The radio 130 includes a receiver section 131 and a transmitter section 132 which comprise means for communicating, that is, transmitting or receiving communication signals for the radio. In the receive mode, the portable radio 130 receives a communication signal via an antenna 133. A transmit/receive (T/R) switch 134 couples the received communication signal to the receiver 131. The receiver 131 receives and demodulates the received communications signal and presents its audio component to a speaker or display 136. It may be appreciated by one of ordinary skill in the art that other functions not herein described may be provided by any suitable means, including a controller means (not shown), which controls the entire operation of the radio 130. The controller is frequently incorporated in the receiver portion, and the combined portion is known to those skilled in the art as a receiver/controller. In the transmit mode, audio messages are coupled from a microphone 137, where they are used to modulate a carrier signal as is well known in the art. The modulated carrier signal is then applied to the antenna 133 through the T/R switch 134 for transmission of the communication signal. It may be appreciated that the optical waveguide 5, according to the principals of the present invention, may be utilized in suitable sections of the radio to replace any copper circuits that are made with existing technology.

In summary, the instant invention provides a novel optical waveguide that enables the waveguide to be modulated instead of modulating the light beam. The cholesteric liquid crystal is converted from a non-reflective state to a reflective state by impressing an electrical signal upon it, thereby causing the waveguide to become transmissive to the light beam. This allows one to use a light beam that is constantly in the 'on' state, and to modulate the data stream instead of modulating the light beam. Many applications of such a technology are envisioned, for example, use in the electronic circuitry of a two way radio. While the preferred embodiments of the invention have been illustrated and described, it will be clear that the invention is not so limited. For example, the optically reflective medium as shown in the drawing figures appears to be flat, however, it can be just as easily formed into a curved section (as viewed longitudinally) to provide an optical waveguide that is closed on the sides. Or, additional reflecting surfaces can be added on the two vertical sides to completely enclose the light path, thereby preventing light from escaping from the waveguide on the edges. Other polygonal shapes and combinations of shapes may also be employed, with suitable efficacy, as desired by the designer. Numerous modifications, changes, variations, substitutions and equivalents will occur to those skilled in the art without departing from the spirit and scope of the present invention as defined by the appended claims.

What is claimed is:

1. An optical waveguide, comprising:

two optically reflective mediums, positioned parallel to each other and in close proximity to form an empty gap between them, the optically reflective mediums comprising a cholesteric liquid crystal polymer, and each optically reflective medium having the capability to be electrically modulated to convert from an optically reflective state to an optically non-reflective state.

2. An optical waveguide, comprising:

two optically reflective mediums, positioned parallel to each other and in close proximity to form an empty gap between them, the optically reflective mediums comprising a cholesteric liquid crystal polymer and each optically reflective medium having the capability to be electrically modulated to convert from an optically reflective state to an optically non-reflective state; and wherein the cholesteric liquid crystal polymer is optically reflective when electrically modulated to an on state and is not optically reflective when electrically modulated to an off state.

3. An optical waveguide for use in the in the visible range, the infrared range or the ultraviolet range, comprising;

two cholesteric liquid crystal polymer layers, positioned parallel to each other and in close proximity to form an empty gap between them;

the cholesteric liquid crystal polymer layers having the capability to transform from optically reflective when electrically modulated to an on state to optically non-reflective when electrically modulated to an off state, so that the waveguide in internally reflective when in the on state.

4. The optical waveguide as described in claim 3, wherein the cholesteric liquid crystal polymer layers are each disposed on a substrate having an electrically conductive layer disposed between the substrate and the cholesteric liquid crystal polymer layer.

5. The optical waveguide as described in claim 3, further comprising;

modulator for impressing an electrical signal upon the cholesteric liquid crystal polymer layers to convert them from the optically reflective state to the optically non-reflective state.

* * * * *